United States Patent
Mlcak

(10) Patent No.: US 11,307,119 B2
(45) Date of Patent: Apr. 19, 2022

(54) AIRCRAFT AIR CONTAMINANT COLLECTOR DEVICE AND METHOD OF USE

(71) Applicant: Pall Corporation, Port Washington, NY (US)

(72) Inventor: Richard Mlcak, Bolton, MA (US)

(73) Assignee: Pall Corporation, Port Washington, NY (US)

( * ) Notice: Subject to any disclaimer, the term of this patent is extended or adjusted under 35 U.S.C. 154(b) by 53 days.

(21) Appl. No.: 16/392,187

(22) Filed: Apr. 23, 2019

(65) Prior Publication Data

US 2020/0340890 A1    Oct. 29, 2020

(51) Int. Cl.

| | |
|---|---|
| *G01N 1/22* | (2006.01) |
| *B64D 13/00* | (2006.01) |
| *B64D 43/00* | (2006.01) |
| *G01N 1/40* | (2006.01) |
| *G01N 29/02* | (2006.01) |
| *G01N 29/036* | (2006.01) |

(52) U.S. Cl.
CPC ........... *G01N 1/2214* (2013.01); *B64D 13/00* (2013.01); *B64D 43/00* (2013.01); *G01N 1/4022* (2013.01); *G01N 29/022* (2013.01); *G01N 29/036* (2013.01); *G01N 2291/014* (2013.01); *G01N 2291/021* (2013.01); *G01N 2291/02809* (2013.01)

(58) Field of Classification Search
CPC .. G01N 1/2214; G01N 1/4022; G01N 29/022; G01N 29/036; G01N 2291/014; G01N 2291/02809; G01N 2291/021; B64D 43/00; B64D 53/02
See application file for complete search history.

(56) References Cited

U.S. PATENT DOCUMENTS

| | | | |
|---|---|---|---|
| 5,356,594 | A | 10/1994 | Neel et al. |
| 6,128,561 | A | 10/2000 | Janata |
| 6,171,378 | B1 | 1/2001 | Manginell et al. |
| 6,212,938 | B1 | 4/2001 | Staples |
| 6,289,287 | B1 | 9/2001 | Meng et al. |
| 6,354,160 | B1 | 3/2002 | Staples et al. |
| 6,421,588 | B1 | 7/2002 | Janata |
| 6,627,965 | B1 | 9/2003 | Tuller et al. |
| 6,839,636 | B1 | 1/2005 | Sunshine et al. |
| 6,953,977 | B2 | 10/2005 | Mlcak et al. |

(Continued)

FOREIGN PATENT DOCUMENTS

| | | |
|---|---|---|
| EP | 2045593 A2 | 4/2009 |
| EP | 2593767 A2 | 5/2013 |

(Continued)

OTHER PUBLICATIONS

Voiculescu, Ioana, et al. "Micropreconcentrator for enhanced trace detection of explosives and chemical agents." IEEE Sensors Journal 6.5 (2006): 1094-1104, (Year: 2006).*

(Continued)

*Primary Examiner* — Herbert K Roberts
*Assistant Examiner* — Fatemeh Esfandiari Nia
(74) *Attorney, Agent, or Firm* — Leydig Voit & Mayer, Ltd.

(57) ABSTRACT

An air contaminant collector device for use in an aircraft air contaminant analyzer, and a method for its use, are disclosed.

16 Claims, 10 Drawing Sheets

(56) References Cited

U.S. PATENT DOCUMENTS

| | | | |
|---|---|---|---|
| 7,103,481 | B2 | 9/2006 | Negri |
| 7,547,931 | B2 | 6/2009 | Star et al. |
| 7,917,309 | B2 | 3/2011 | Brodsky |
| 7,955,574 | B2 | 6/2011 | Fryxell et al. |
| 8,221,828 | B2 | 7/2012 | Chinn et al. |
| 8,366,630 | B2 | 2/2013 | Haick et al. |
| 8,652,853 | B2 | 2/2014 | Markowitz et al. |
| 9,296,839 | B2 | 3/2016 | Venema et al. |
| 9,311,805 | B2 * | 4/2016 | Zishaan ............ H04M 1/72454 |
| 9,459,223 | B1 | 10/2016 | Alqahtani et al. |
| 9,599,564 | B1 | 3/2017 | Li |
| 2004/0060344 | A1 | 4/2004 | Kauffman et al. |
| 2005/0016276 | A1 | 1/2005 | Guan et al. |
| 2006/0133975 | A1 * | 6/2006 | Yamanaka ........... B01J 20/3236 423/210 |
| 2010/0120167 | A1 | 5/2010 | McGill et al. |
| 2010/0130796 | A1 | 5/2010 | Combes et al. |
| 2013/0199271 | A1 | 8/2013 | Beer et al. |
| 2014/0060400 | A1 | 3/2014 | Park et al. |
| 2015/0053080 | A1 * | 2/2015 | Boehringer ............. B01J 39/00 422/616 |
| 2016/0364852 | A1 | 12/2016 | Omodt et al. |
| 2017/0045399 | A1 | 2/2017 | Lash et al. |
| 2017/0097255 | A1 | 4/2017 | Karakaya |
| 2017/0131186 | A1 * | 5/2017 | Williams .............. G01N 1/2273 |
| 2017/0184556 | A1 * | 6/2017 | Toffoli ..................... G01N 5/04 |
| 2017/0342276 | A1 | 11/2017 | Wang et al. |
| 2017/0363524 | A1 | 12/2017 | Reed |
| 2018/0221810 | A1 * | 8/2018 | Chang .................. B01D 53/343 |
| 2019/0262762 | A1 * | 8/2019 | Gadkaree ........... B01J 20/28061 |
| 2020/0340889 | A1 | 10/2020 | Mlcak et al. |
| 2020/0340949 | A1 | 10/2020 | Mlcak et al. |
| 2020/0340950 | A1 | 10/2020 | Mlcak et al. |

FOREIGN PATENT DOCUMENTS

| | | | |
|---|---|---|---|
| JP | 2009-150652 A | 7/2009 | |
| TW | 201238653 A1 * | 10/2012 | ............. B01J 20/34 |
| WO | WO 2004/005907 A1 | 1/2004 | |
| WO | WO 2013/064157 A1 | 5/2013 | |
| WO | WO 2016/189420 A1 | 12/2016 | |

OTHER PUBLICATIONS

European Patent Office, Extended European Search Report in counterpart European Patent Application No. 20164134.7, dated Sep. 23, 2020.

Voiculescu et al., "Micropreconcentrator for Enhanced Trace Detection of Explosives and Chemical Agents," *IEEE Sensors Journal*, 6(5): 1094-1104 (2006).

Pall Corporation, "Gaskleen® Pico1000 Analyzer," Product Data Sheet (Aug. 2015).

Wikipedia, "Triethoxysilane," (Jul. 7, 2015) accessed at <en.wikipedia.org/wiki/Triethoxysilane> on Jan. 11, 2019.

Singapore Patent Office, Search Report in counterpart Singapore Patent Application No. 10202002680S, dated Jan. 21, 2021.

C-C, Lu et al., "Multi-field simulations and characterization of CMOS-MEMS high-temperature smart gas sensors based on SOI technology," *J. Micromech. Microeng.* 18 (2008) 075010 (11pp).

European Patent Office, Examination Report issued in counterpart European Patent Application No. 20 164 134.7, dated Feb. 3, 2022.

* cited by examiner

AIRCRAFT AIR CONTAMINANT COLLECTOR DEVICE AND METHOD OF USE

BACKGROUND OF THE INVENTION

Contaminants such as turbine engine oil and hydraulic fluid can be present in air or other gasses in the cabin/cockpit of an aircraft, during flight and/or during ground operation. Certain contaminants can be present in aerosol form, particulate form, and/or gaseous form, and the quantity of contaminants can vary significantly, even over orders of magnitude, leading to sensor fouling and/or delayed sensor response. When a plurality of contaminants are present, they may differ in quantity, such that certain contaminants (present in higher or lower concentrations than other contaminants) are detected while others are not detected. Detecting and identifying the composition or type of contamination is often needed to protect health and/or equipment, detect faults, and help identify the source or cause of the contamination. Inability to detect and identify the contamination may cause the need for a flight diversion, flight cancellation, or emergency landing to ensure the safety of passengers and crew, which, at a minimum, is an inconvenience, and increases costs.

There is a need for improved methods for detection, detection systems, and detection system components. The present invention provides for ameliorating at least some of the disadvantages of the prior art. These and other advantages of the present invention will be apparent from the description as set forth below.

BRIEF SUMMARY OF THE INVENTION

An embodiment of the invention provides an air contaminant collector device for use in an aircraft air contaminant analyzer comprising (A) an air contaminant collector comprising (a) a porous member comprising microporous flow-through channels and a chemoselective coating, the porous member having a top surface and a bottom surface, wherein the porous member remains functional and desorbs captured air contaminants while being heated for a controlled time period; (b) a thin film resistive heater, capable of heating to a temperature that vaporizes captured air contaminants, wherein the heater is in contact with the top surface of the porous member; and; (B) an air contaminant collector base comprising (c) a first substrate, wherein the porous member and the thin film resistive heater are associated with the first substrate, the porous member and the heater being thermally insulated from the base.

In another embodiment, a method for capturing and desorbing captured air contaminants is provided, the method comprising passing air through an embodiment of the air contaminant collector device, capturing air contaminants by the porous member, and heating the porous member to a temperature sufficient to vaporize the captured air contaminants and desorb the captured air contaminants.

BRIEF DESCRIPTION OF THE SEVERAL VIEWS OF THE DRAWING(S)

FIG. 1 is a diagrammatic top view of an embodiment of the air contaminant collector device, showing the porous member, the heater, the chemoselective coating, the base, and tethers, wherein the tethers connect the porous member to the base.

FIG. 2A is a diagrammatic enlarged view of a portion of the embodiment of the air contaminant collector device shown in FIG. 1, showing channels in the base providing tethers for connecting the porous member to the base, also showing the thin film resistive heater associated with the top surface of the porous member (surrounding the flow-through channels of the porous member), and on the tethers, also showing electrical traces and the chemoselective coating, wherein only portions of the coating and the heater are shown so that other components can also be shown. FIG. 2B shows an enlarged view of the bottom surface of the porous member, also showing the bottom surfaces of the tethers connecting the porous member to the base.

FIG. 3 is a diagrammatic cross-sectional view of an embodiment of the air contaminant collector device with the coating, also showing electrical traces, and an insulator layer, wherein the traces are on top of the heater and insulating layer, and the insulating layer forms the top surface of the porous member.

FIG. 4 is a diagrammatic representation of an illustrative air craft air contaminant analyzer comprising an embodiment of the aircraft air contaminant collector device according to the invention, the aircraft air contaminant collector device comprising a microporous medium comprising microporous flow-through channels and a chemoselective coating, and a heater, wherein the heater is in contact with a microporous medium; the illustrated embodiment of the air craft air contaminant analyzer also including a gravimetric sensor; and a pump, also showing the flow of a sample through the aircraft air contaminant analyzer, wherein the gravimetric sensor is positioned upstream of the porous member with sample flow arranged to avoid flow toward the sensor's surface.

DETAILED DESCRIPTION OF THE INVENTION

Figure 1:
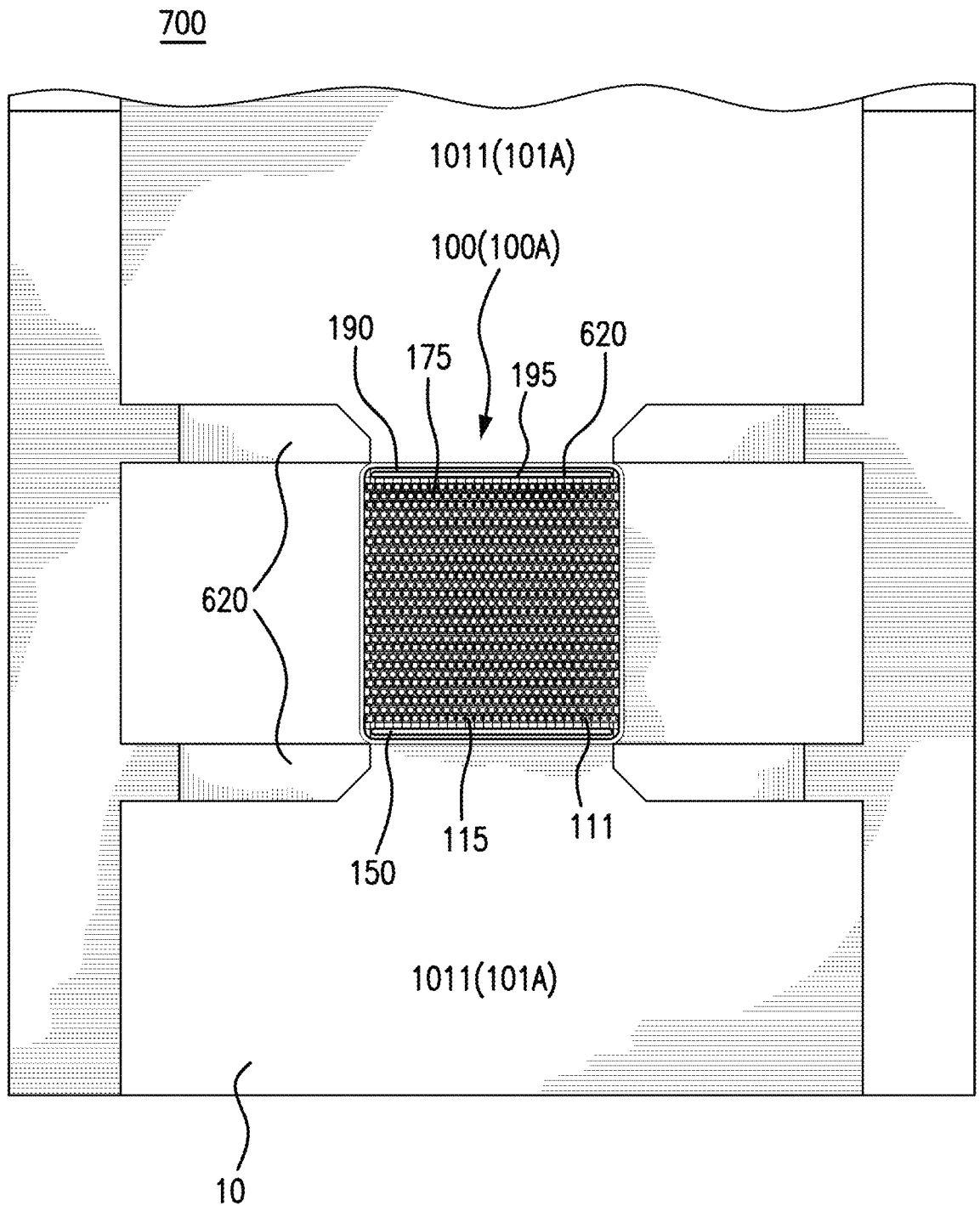

An embodiment of the invention provides an air contaminant collector device for use in an aircraft air contaminant analyzer comprising (A) an air contaminant collector comprising (a) a porous member comprising microporous flow-through channels and a chemoselective coating, the porous member having a top surface and a bottom surface, wherein the porous member remains functional and desorbs captured air contaminants while being heated for a controlled time period; (b) a thin film resistive heater, capable of heating to a temperature that vaporizes captured air contaminants, wherein the heater is in contact with the top surface of the porous member; and; (B) an air contaminant collector base comprising (c) a first substrate, wherein the porous member and the thin film resistive heater are associated with the first substrate, the porous member and the heater being thermally insulated from the base.

In a preferred embodiment, the porous member comprises a microporous membrane and the thin film resistive heater deposited directly on the top surface of the membrane.

In an embodiment of the device, the first substrate has channels providing a tether, typically a plurality of tethers, connecting the porous member to the first substrate.

In another embodiment, a method for capturing and desorbing captured air contaminants is provided, the method comprising passing air through an embodiment of the air contaminant collector device, capturing air contaminants by the porous member, and heating the porous member to a temperature sufficient to vaporize the captured air contaminants and desorb the captured air contaminants.

In accordance with embodiments of the method, the air contaminants comprise aerosols and/or particulates, and/or vapor(s).

Advantageously, heating is uniform over the surface of the porous member, without localized hot-spots or overheating.

In other advantage, the air contaminant collector device is not "single use," e.g., it is resistant to fouling and can be used repeatedly in an aircraft air contaminant analyzer to measure the contaminant concentration(s) and determine the contaminant type(s).

In another advantage, particularly when two or more aircraft air contaminant collector devices are utilized, different fluids with similar properties (e.g., vapor pressure and/or density) can be more accurately classified.

In a typical embodiment, a device can be located in the ECS (Environmental Control System) vent or duct since there will be a delay before the contaminant concentration in the large volume cabin increases to the level coming out of the ECS vents. However, a variety of locations are suitable for a device, such as, e.g., in the cockpit, cabin, overhead luggage compartment, storage compartment, galley area, avionics bay, auxiliary power units, etc. Alternatively, a device can be installed in one location and air from another location directed to the analyzer via a variety of air transfer devices including, e.g., piping, tubing, and/or ducts.

Alternatively, or additionally, a device can be located, e.g., at or near a bleed air line, wherein pressurized air from an engine is transferred to the ECS. One benefit of a device at or near the bleed air line is that sampling bleed air from each engine informs and can identify which engine is faulty, allowing the crew to stop supplying contaminated bleed air from a faulty engine to the ECS. In contrast, a device located in the cabin, whether sampling from the cabin or ECS vent or ECS duct will inform there is a contaminant source, but not which engine or APU (auxiliary power unit) is the source of contamination.

Typically, an embodiment of an aircraft air analyzer including the air contaminant collector device comprises (a) at least one aircraft air contaminant collector device comprising (i) a porous member having a chemoselective coating; and, (ii) the thin film resistive heater; (b) an air contaminant collector base comprising a first substrate, having a top surface and a bottom surface; wherein the at least one contaminant collector is associated with the first substrate, the porous member and the thin film resistive heater being thermally insulated from the first substrate; the air craft air contaminant analyzer also including (c) a gravimetric sensor arranged to generate a proportionate resonant frequency response when air contaminant mass is added to or removed from the gravimetric sensor; (d) a second substrate, having a top surface and a bottom surface; wherein the gravimetric sensor is associated with the top surface of the second substrate, the gravimetric sensor being separated from the contaminant collector by a constant distance, the gravimetric sensor being arranged to receive air contaminants desorbed from the porous member when the porous member is heated; (e) a support comprising a top surface and a bottom surface, the support comprising at least one aircraft air inlet port passing through the top surface and the bottom surface of the support, wherein the bottom surface of the second substrate is associated with the top surface of the support; (f) a resonant frequency measurement device, arranged to measure the proportionate resonant frequency response generated by the gravimetric sensor as the air contaminant is added to and removed from the gravimetric sensor; (g) a computer readable medium bearing an air contaminant recognition program and calibration data; (h) a processor configured to execute the air contaminant recognition program, the contaminant recognition program including a module configured to classify air contaminant by type, and a module programmed to use the calibration data for comparison with magnitude of the proportionate resonant frequency response generated by the gravimetric sensor to calculate air contaminant concentration; and, (i) a pump, arranged to generate flow of aircraft air through at least one aircraft air inlet port and through the at least one air contaminant collector device before and after the porous member is heated.

The aircraft air contaminant analyzer includes a measurement circuit to measure frequency at a sufficient rate to precisely resolve the gravimetric sensor's response, typically about 10 to about 100 measurements per second per gravimetric sensor. Measurement is synchronized with other analyzer functions, particularly, the function of heating the microporous medium. Measurement is typically over a duration sufficient to resolve the maximum frequency change and the rate of recovery of the gravimetric sensor's response, typically, for example, a duration of about 1 second to about 4 seconds long.

A sufficient volume of sample at a prescribed rate (for example, about 500 to about 2000 standard cubic centimeter per minute (sccm)) for a prescribed period of time (for example, about 10 to about 60 seconds) is flowed through the analyzer to achieve a response magnitude sufficiently over the measurement noise level to resolve the shape of the sensor's frequency versus time curve, typically, a signal-to-noise ratio of about 4:1 or greater.

The kinetics of transfer, adsorption and desorption of the different contaminants results in different response shapes for the different contaminants. Illustratively, if 4 different compounds (e.g., nitromethane triacetone triperoxide, ethylene glycol dinitrate, and 2,3 dimethyl 2,3 dinitrobutane) were superimposed on a single graph for ease of reference, the shape of sensor frequency versus time responses for the compounds would show that the higher vapor pressure (lighter) compounds are released from the membrane more quickly than the lower vapor pressure (heavier) compounds, e.g., nitromethane is released before triacetone triperoxide, ethylene glycol dinitrate, and 2,3 dimethyl 2,3 dinitrobutane.

The flow along the sample flow path through the porous member (e.g., a microporous medium, more preferably, a microporous membrane) generated by the pump should be stopped such that it is zero or nearly zero (e.g., about 5 sccm or less) before the porous member is heated, e.g., typically, flow should be stopped for at least 0.2 seconds before heating.

Preferably, while repeatedly measuring frequency, the porous member is heated by applying a voltage step bringing it to a temperature of at least about 400° C. in about 0.1 seconds. Typically, the porous member is heated to at least about 200° C., more typically, at least about 400° C., in some embodiments, to about 550° C., for at least about 1 second, preferably, at least about 2 seconds (e.g., up to about 10 second, or more), to vaporize (desorb) the contaminant(s) so that the next measurement can begin from a "fresh start." In order to zero out ("self-zero") gravimetric sensor drift, the sensor's response is referenced to the frequency the sensor had just before heating the porous member.

When the porous member is not being heated, the analyzer is preferably maintained at a fixed temperature, e.g., a fixed temperature in the range of from about 30° C. to about 70° C.

The contaminant(s) can be classified by type using a pattern recognition algorithm to recognize each contaminant by its unique response, the shape of the sensor's frequency versus time curve, which is influenced by the contaminant's material properties such as, but not limited to, one or more of any of the following: vapor pressure, heat capacity, heat of condensation, heat of evaporation, absorption and desorption kinetics, and diffusion rate. A variety of algorithms can be used to classify the contaminant(s) from the contaminant-specific response shape. Suitable algorithms include, for example, neural nets, principal component analysis, support vector machine based classification, linear discriminant analysis and decision tree analysis.

Concentration of the contaminant(s) can be calculated by comparing the magnitude of the response(s) to a pre-determined calibration file, e.g., a curve or lookup table giving values for the contaminant concentration(s) as a function of the magnitude of the response(s).

The gravimetric sensor (which can comprise a single sensor or a sensor array) generates a precise and proportionate frequency response to mass added or removed from the sensor. Preferably, the response is provided over a wide dynamic range, such that it is not over-dampened by small quantities of transferred contaminant (analyte). The gravimetric sensor is operated as part of an amplified oscillator circuit to maintain it at resonance.

Each of the components of the invention will now be described in more detail below, wherein like components have like reference numbers.

In the illustrative embodiment shown in FIGS. 1, 2A, 2B, and 3, the aircraft air contaminant collector device 700 comprises a base 10 comprising a first substrate 101I comprising a first substrate primary layer 101 having a first substrate top layer 101A and a first substrate bottom layer 101B (FIG. 3), and a porous member 100 (e.g., a microporous membrane 100A) on the first substrate, the porous member having a top surface 111 and a bottom surface 112 (FIGS. 2B and 3), the porous member comprising microporous flow-through channels 115 (through the top surface and the bottom surface of the porous member) and a chemoselective coating 150 (shown in FIGS. 1, 2A, and 3), wherein the porous member remains functional and desorbs captured air contaminants while being heated for a controlled time period, and a thin film resistive heater 175, capable of heating to a temperature that vaporizes captured air contaminants, wherein the heater is in contact with (in and/or on) the top surface of the porous member; wherein the layers 101A and 101B, the porous member 100, the heater 175, wire traces (discussed below) and an optional packaging layer (also discussed below) are associated with (e.g., mounted to or fabricated on) the first substrate primary layer 101 by, for example, additive processes, and channels 115 and tethers 190 (discussed below), as well as the cavity below the porous member 100 (shown in FIG. 3) are fabricated by, for example, subtractive processes.

While FIGS. 1, 2A, 2B, and 3 show a first substrate 101' comprising a first substrate primary layer 101 having a first substrate top layer 101A and a first substrate bottom layer 101B, it should be recognized by one of skill in the art that other processes for forming the porous member 100 may not require layers 101A and/or 101B.

Figure 2A:
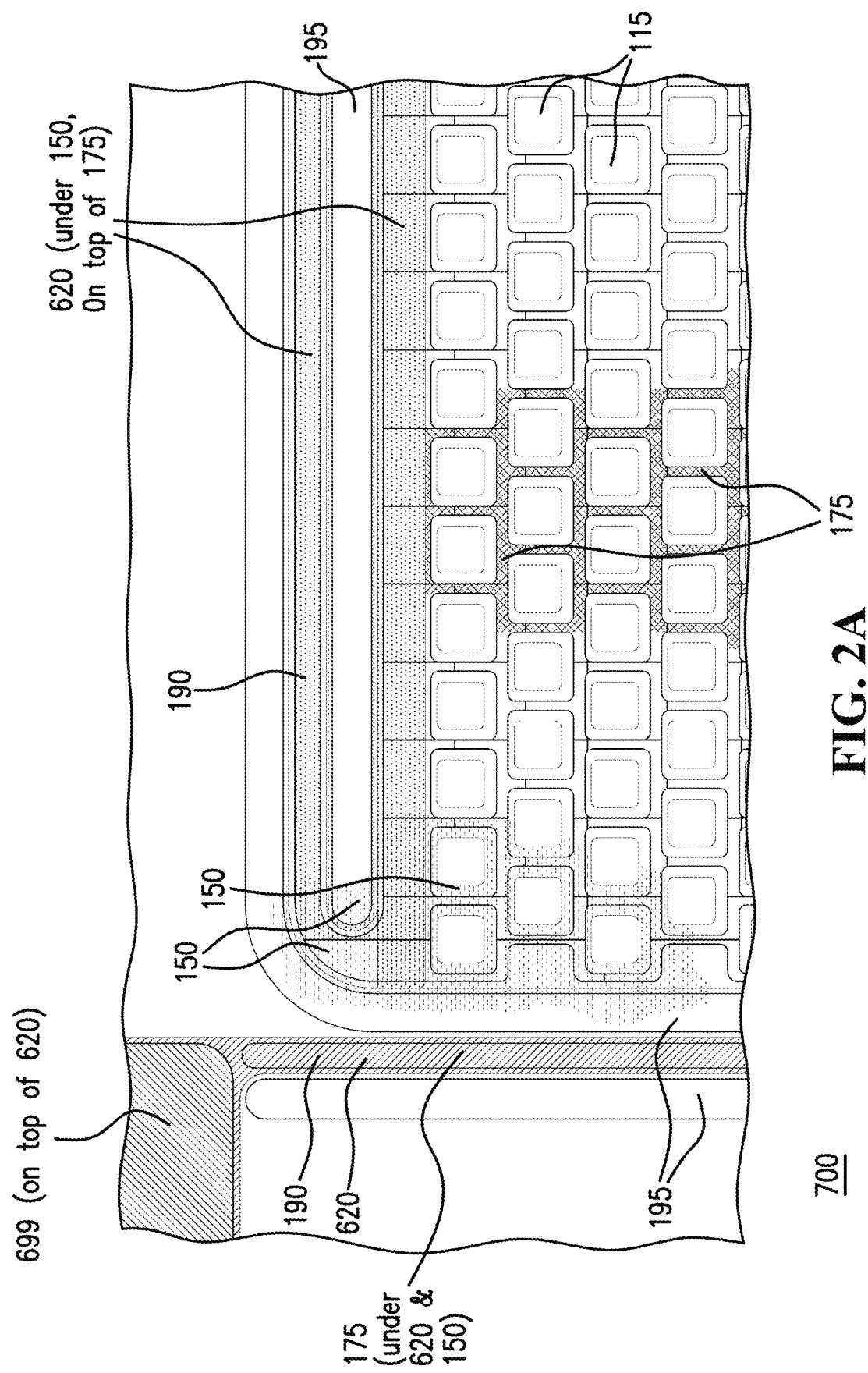
Figure 2B:
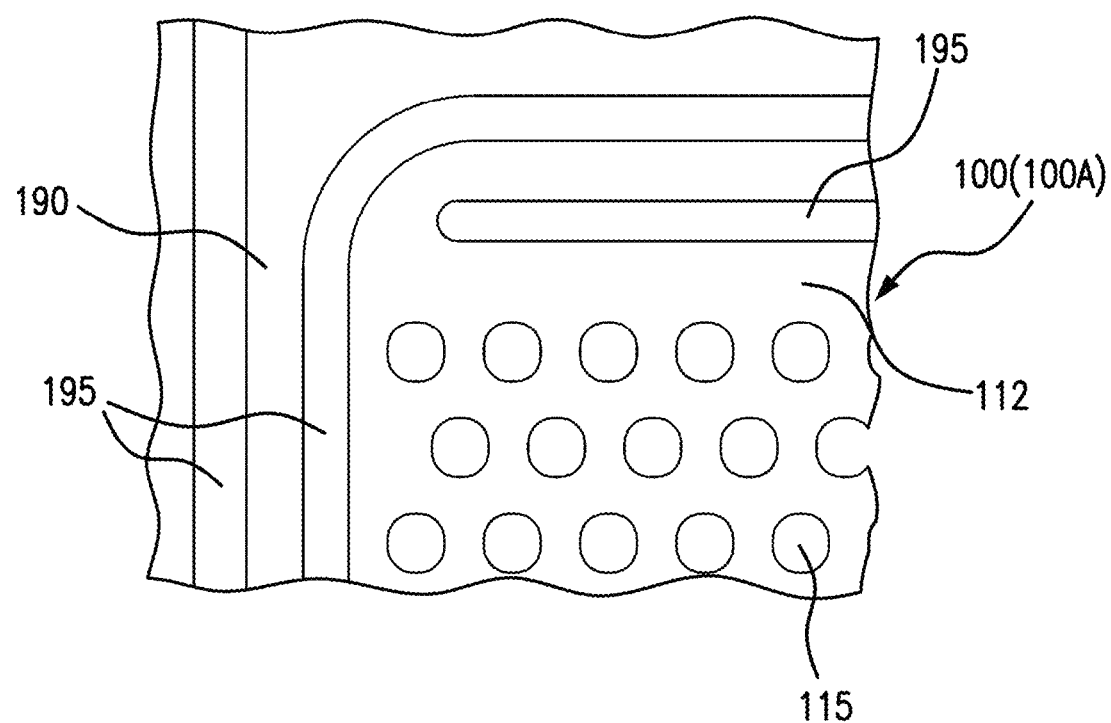
Figure 3:
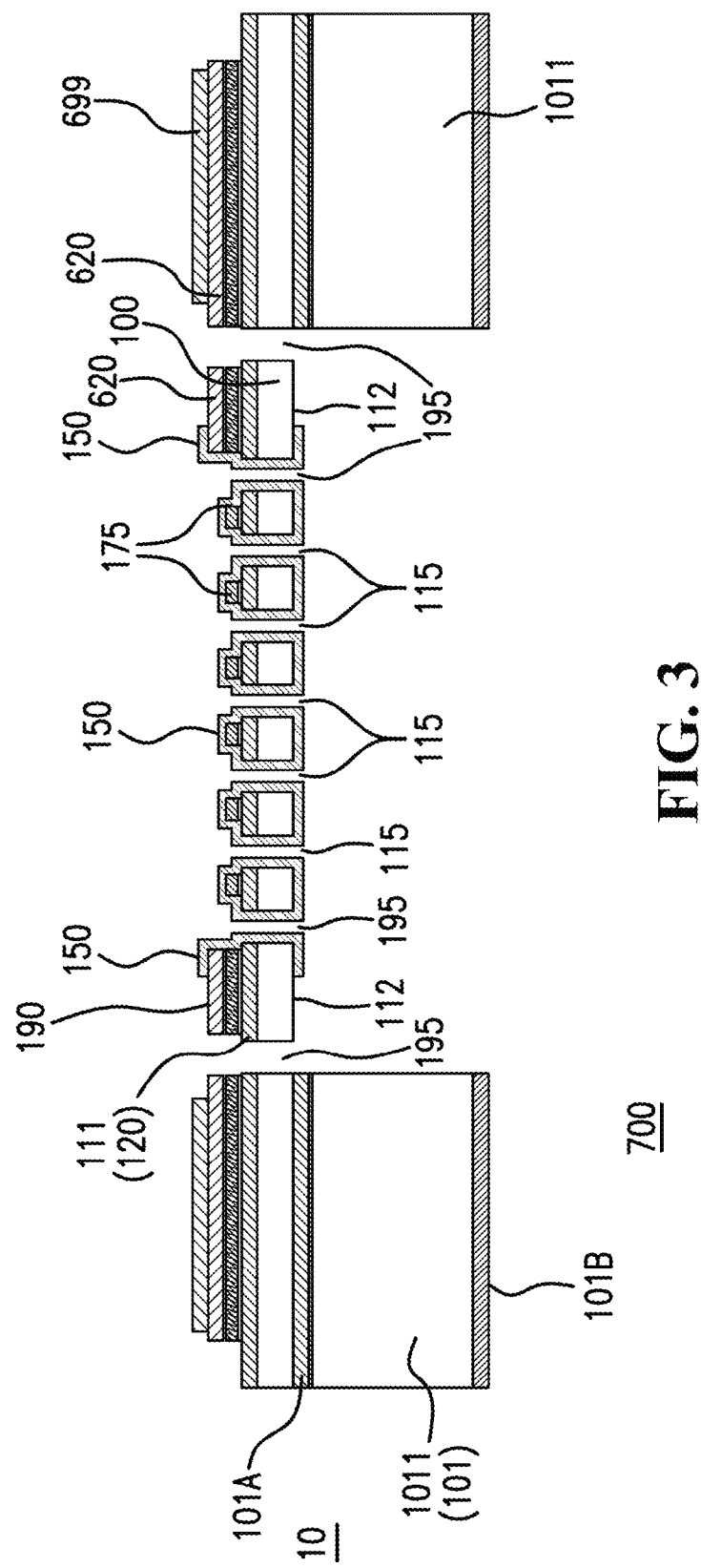

As shown in FIGS. 1, 2A, and 3, an embodiment of the aircraft air contaminant collector device 700 typically includes one or more electrical traces as part of the electronics (as discussed in more detail below). For example, FIGS. 1, 2A, and 3 show electrical traces 620 that can communicate with wirebonds (not shown) communicating with the heater 175. Optionally, as also shown in FIGS. 1, 2A, and 3, an embodiment of the aircraft air contaminant collector device 700 may include a packaging layer 699 covering at least a portion of the wire traces, e.g., providing low resistance and allowing the wirebonds to form a reliable electrical contact and more efficiently move heater current from the wirebonds to the heater. In some embodiments, the packaging layer is made from gold, and the electrical trace is made from a high temperature metal such as platinum, which remains electrically and mechanically stable in higher temperatures.

Typically, the chemoselective coating 150 covers all surfaces of the member (e.g., top, bottom, the flow-through channels; coating in channels/pores not shown in FIG. 2A) as well as the top of the heater and electrical traces, without covering the packaging layer 699.

Preferably, the porous member and heater are thermally insulated from the base 10 and the first substrate 101I, for example, the porous member is thermally insulated from 101, 101A, and 101B (e.g., by tethers 190 connecting the porous member to the substrate, e.g., as shown in FIGS. 1, 2A, and 3) to reduce conductive heat loss at the edges of the porous member, also allowing rapid and uniform heating with low power. In an embodiment, channels 195 are etched through the first substrate, and define the tethers (e.g., the tethers are portions of the first substrate remaining after channels have been etched therethrough). In contrast with the flow-through channels 115 (typically having a diameter of about 50 micrometers or less), the channels 195 are typically elongated, and define the tethers.

In the embodiment illustrated in FIGS. 2A and 3, the thin film resistive heater 175 is arranged in or on the top surface 111 of the porous member (surrounding the flow-through channels 115 of the porous member), and on the tethers.

In some embodiments, e.g., as illustrated diagrammatically in FIG. 3, the top surface 111 of the porous member comprises an insulating layer 120 (e.g., $SiO_2$) underneath the heater (and any other structure carrying current, e.g., electrical traces) to prevent current from shorting through the porous member.

Figure 4:
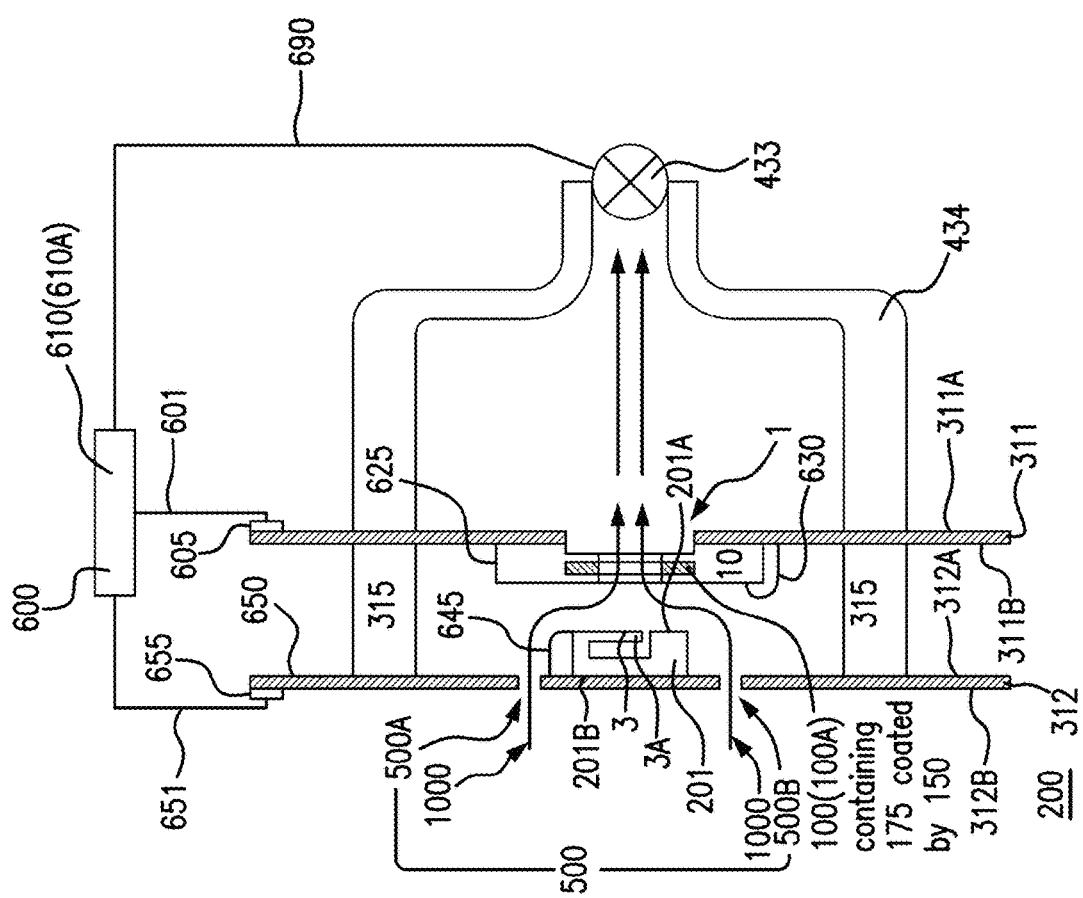

FIG. 4 illustrates an embodiment of an aircraft air contaminant analyzer 200 comprising at least one aircraft air contaminant collector device 700 (see also, FIGS. 1-3) providing a sample flow path 1000, the collector device comprising the base 10 comprising the first substrate 101I and the microporous medium 100, and the thin film resistive heater 175. In this illustrated embodiment, the aircraft air contaminant collector device 700 is associated with (e.g., mounted on) a first support 311, typically a printed circuit board, the first support having a top surface 311A and a bottom surface 311B. Flow along the flow path is generated by a pump 433.

The analyzer 200 includes a gravimetric sensor 3, arranged near the collector device along the first flow path to generate a proportionate resonant frequency response when air contaminant mass is added to or removed from the gravimetric sensor, for quantifying the amount of air contaminant and classifying air contaminant by type; and a second substrate 201, having a top surface 201A and a bottom surface 201B; wherein the gravimetric sensor 3 is associated with (e.g., mounted on or fabricated within, e.g., by subtractive and additive processes) the top surface of the second substrate, the gravimetric sensor being separated from the contaminant collector device by a constant distance, the gravimetric sensor being arranged to receive air contaminants desorbed from the microporous medium when the microporous medium is heated.

The embodiment of the analyzer shown in FIG. 4 also includes a second support 312 comprising a top surface 312A and a bottom surface 312B, the second support comprising at least one aircraft air inlet port 500 (FIG. 4 shows air inlet ports 500A and 500B) passing through the top surface and the bottom surface of the support, wherein the bottom surface of the second substrate is associated with (e.g., mounted on) the top surface of the second support. Typically, the second support comprises a printed circuit board. Optionally, an embodiment of the analyzer can include an air inlet manifold including the air inlet port(s).

Separation between the gravimetric sensor and the porous member should be kept constant, typically at a distance of about 0.1 mm to about 2 mm, preferably about 0.2 mm to about 0.4 mm. For example, FIG. 4 shows spacers 315 between the first support 311 and the second support 312 for maintaining the spacing between the sensor and the porous member. Preferably, the length of the spacers is such that the separation between the collector device and the gravimetric sensor facing surfaces are about 0.2 mm to about 0.4 mm.

The embodiment shown in FIG. 4 also include electronics 600, comprising a power source or a connection to a power source, a power regulator, a measurement circuit 610 comprising a resonant frequency measurement device 610A comprising an oscillator and a field-programmable gate array (FPGA), arranged to measure the proportionate resonant frequency response generated by the resonator array to allow classification of air contaminant type(s); a computer readable medium bearing an air contaminant recognition program; a processor configured to execute the air contaminant recognition program, the contaminant recognition program including a module configured to measure oscillation rate and classify air contaminant type(s), and programmed with a calibration table for comparison with magnitude of the proportionate resonant frequency responses generated by the resonator array(s) to calculate air contaminant concentration(s) and determine air contaminant type(s). If desired, the air contaminant recognition program executed by the processor is stored upon a non-transitory computer-readable medium, and the processor displays (outputs) a value for the determined air contaminant type(s). For example, the value(s) can be displayed through a GUI using a display device (such as a hand-held device) operably arranged with the processor. Alternatively, or additionally, for example, the value(s) can be displayed by an illuminated indicator or communicated audibly.

Figure 5:
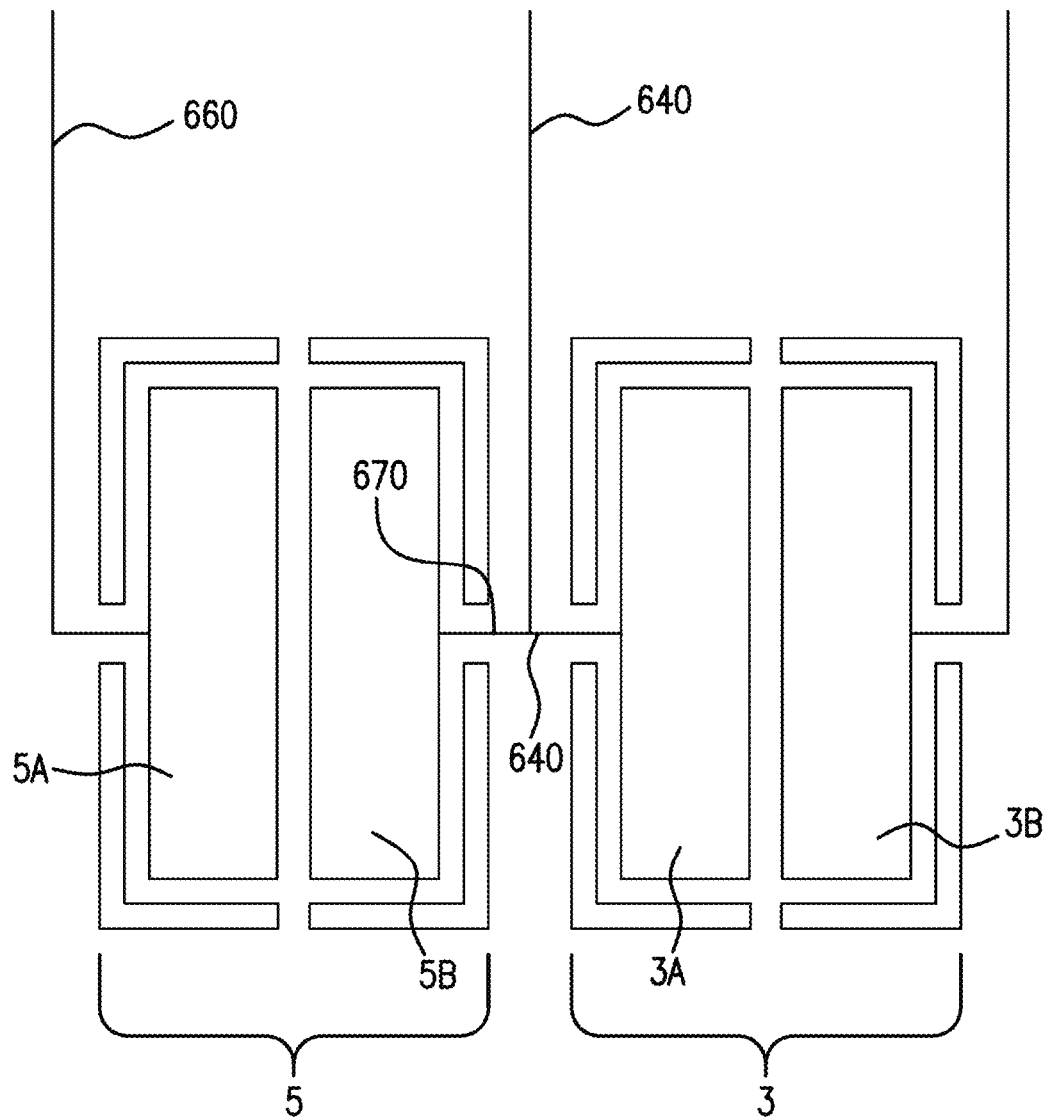
FIG. 5 is a diagrammatic representation showing an illustrative gravimetric sensor (having first and second electrodes), the sensor also including a balance capacitor (having first and second balance capacitor electrodes) as part of an aircraft air contaminant analyzer according to an embodiment of the invention.

The electronics can have a variety of arrangements as known in the art. In the illustrated embodiments, the electronics provide power when needed to the heater 175 via a cable 601, connector 605, electrical traces 620 fabricated into first support 311 (so traces not visible), wirebonds 625, and traces 630 fabricated onto collector 10 (so traces not visible), and power to the pump 433 (discussed below) when needed via cable 691. As discussed below with respect to FIG. 4, the electronics with respect to the gravimetric sensor can also include, for example, electrical traces 640, wirebonds 645, electrical traces 650 fabricated into second support 312 (so not visible), 660, 670 (as shown in FIG. 5), connector 655, and cable 651.

In those embodiments including additional collectors and gravimetric sensors, each gravimetric sensor would typically have its own oscillator circuit, electrical traces and wirebonds. They may have separate cables and connectors, or signals may be routed into multi-wire cables and connectors. One field programmable gate array (FPGA) is typically capable of counting the resonant frequencies of multiple gravimetric sensors. All collectors can be wired in parallel and heated from the same electronics power circuit, or alternately can be powered by separate circuits and heated independently, for example to different temperatures or durations.

If desired, resonance frequency can be measured using, for example, a phase lock loop or a digital signal processor (DSP) chip to perform frequency sweeps to identify the resonant frequency from the sweep spectra.

Alternatively, if desired, a resonant frequency measurement device comprising a laser and a photodetector can be arranged to measure the proportionate resonant frequency response generated by the gravimetric sensor.

The illustrated embodiment of the aircraft air contaminant analyzer also includes a pump 433, arranged to generate aircraft air sample flow along the sample flow path 1000 through the aircraft air inlet port and through the air contaminant collector before and after the porous member is heated.

A variety of pumps are suitable for use in accordance with embodiments of the aircraft air contaminant analyzer. As shown in FIG. 4, the pump 433 is preferably positioned downstream of the porous member and the gravimetric sensor, wherein an optional air-tight cover 434 (and/or an optional inlet manifold (not shown)), second support 312, first support 311, and spacer 315 isolate the sample to avoid its contamination or dilution, and to ensure that flow generated by the pump all flows through 100, and the pump is positioned after the gravimetric sensor and the porous member to ensure that the pump does not contaminate the sample, and the gravimetric sensor is positioned upstream of the porous member with sample flow arranged to avoid flow toward the sensor surface, thus minimizing the transfer of contaminants and undesirable material (such as dust, aerosols, and/or particulates) onto the surface of the sensor.

In those embodiments including two or more aircraft air contaminant collector devices and corresponding gravimetric sensors (providing a collector-sensor set), each collector-sensor set is maintained at the same environmental conditions (e.g., temperature, pressure, relative humidity) as the other set(s), as this provides better detection performance by reducing "noise" in the response patterns caused by measuring each set at different times or under different conditions. Preferably, all of the collector-sensor sets are arranged in close proximity.

Each collector-sensor set should have similar sensitivity as the other set(s) such that each provides responses above the noise level to provide good accuracy.

A variety of gravimetric sensors are suitable for use in embodiments of the invention, including, for example, gravimetric sensors selected from a thin film resonator (TFR), a surface acoustic wave (SAW) resonator, a thickness sheer mode (TSM) resonator (quartz crystal microbalance (QCM) resonator), an acoustic plate mode (APM) resonator, a flexural plate wave (FPW) resonator, a bulk acoustic wave (BAW) resonator, a piezoelectric bimorph resonator array sensor, and a tuning fork sensor.

In an embodiment, the sensor can be coated with functionalized $SiO_2$ nanoparticles (e.g., functionalized with tri-ethyoxysilanes) Suitable tri-ethyoxysilanes for producing functionalized $SiO_2$ nanoparticles include, for example, 3-[2-(3-Triethoxysilylpropoxy)ethoxy]sulfonlane, 95%; Phenethyltrimethoxysilane, tech-95; 3-Methyoxypropyltrimethoxysilane; N-(Acetylglycl)-3-Aminopropyltrimethoxysilane, 5% in methanol; and Dodecafluorodec-9-Ene-1-Yltrimethoxysilane, 95%. In some embodiments, the functionalized $SiO_2$ nanoparticles form self-assembled monolayers that can be deposited on the surface of the sensor.

In one embodiment, the gravimetric sensor comprises a piezoelectric bimorph resonator array comprising two active layers, the layers bending under resonance, the resonator array generating a proportionate change in resonant frequency upon the addition or removal of air contaminant mass. One example of such a gravimetric sensor is disclosed in U.S. Pat. No. 6,953,977.

In an embodiment shown in FIG. 5, the gravimetric sensor 3 includes a first electrode 3A and a second electrode 3B (collectively forming a resonator) so that motion of the sensor is transduced into an electrical signal via the first electrode on the surface of the sensor, and the signal can be amplified and returned to the second electrode on the sensor surface to drive the sensor at resonance. The gravimetric sensor can further comprise an optional balance capacitor 5 comprising a first balance capacitor electrode 5A and a second balance capacitor electrode (measuring electrode) 5B included adjacent to the resonator to reduce the contributions of parasitic capacitances and resistances from the electrical signal, wherein the balance capacitor has similar or identical materials of construction and dimensions as the gravimetric sensor but is made incapable of motion (e.g., wherein there is no space on the substrate allowing the balance capacitor to move). The balance capacitor can be driven with, for example, a 180° phase shifted signal through a dedicated electrical trace to the first balance capacitor electrode. The signal transduced from the second balance capacitor electrode (measuring electrode) is combined with the signal transduced by the sensor's first electrode as it is routed to the electronics, e.g., a field programmable gate array (FPGA) and firmware that counts the rate of oscillation.

As recognized in the art, a variety of types of electronics are suitable for measuring the proportional frequency responses of the various gravimetric sensors.

A variety of materials are suitable for porous members 100 such as microporous media (e.g., microporous membranes) for use in accordance with embodiments of the invention. In addition to microporous membranes, suitable microporous media include fibrous materials, ceramics, printed structures, and micromachined structures. The porous member can be supported or unsupported. Typically, in those embodiments wherein the microporous medium is a microporous membrane, the membrane has a thickness in the range of at least about 20 micrometers to about 500 micrometers, more typically, a thickness in the range of about 50 micrometers to about 200 micrometers, though membranes can have lesser or greater thicknesses for some applications.

The porous member 100, for example, a microporous medium such as a microporous membrane, is porous or perforated, providing suitable regular and/or irregular flow through channels and/or pores, e.g., about 5 micrometers to about 50 micrometers, typically, a 10 micrometers to about 30 micrometers, in size and/or diameter, though the pores or perforations can be smaller or larger for some applications. The membrane includes a hydrophobic zeolite coating associated with (e.g., affixed and/or covalently bonded to) the top and bottom surfaces and the inside of the flow channels and/or pores and/or hydrophobic zeolite particles in the bulk of the membrane.

A variety of chemoselective coatings are suitable for use in embodiments of the invention, e.g., porous silica, activated carbon, metal-organic frameworks (MOFs), zeolitic imidazolate frameworks (ZIFs), titania ($TiO_2$) particles, and zeolites, including hydrophobic zeolites and hydrophilic zeolites. Suitable zeolite coatings include, but are not limited to, Z100 (hydrophobic zeolite); Z110 (hydrophobic zeolite); Z300 (less hydrophobic zeolite); and Z810 (hydrophilic zeolite) (Zeochem LLC, Louisville, Ky.).

Suitable heaters 175, preferably, thin film resistive heaters, are known in the art. Illustrative heaters include, for example, platinum (Pt) and tantalum-platinum (TaPt) high temperature compatible thin film resistive heaters, which allow the microporous medium to be ohmically heated to, for example, about 550° C. without degradation. Preferably, the heater is fabricated in place onto the substrate, e.g., with a combination of deposition, lithography, and dissolution, processes.

A variety of materials are suitable for use as the first and second supports, the base, and the substrates, and suitable materials are known in the art and are readily manufacturable using microelectronics fabrication processes. For example, they can be fabricated from materials such as silicon. Typically, the materials are micromachinable, as they desirably allow micromachining to include, if desired, electrical structures such as traces, electrodes, and interconnects to bring electrical power where needed, and/or include mechanical structures such as suspended plates, tethers and membranes, and fluidic structures such as flow channels.

The following examples further illustrates the invention but, of course, should not be construed as in any way limiting its scope.

Example 1

This example demonstrates that heating is generally uniform over a tethered porous member.

An air contaminant collector device is provided as generally illustrated in FIGS. 1, 2A, and 3, wherein the channels have been produced by etching.

The porous member is a microporous silicon membrane having about 25 micrometer diameter flow-through channels etched through the membrane, the membrane further having a hydrophobic zeolite powder coating (Z300; Zeochem LLC, Louisville, Ky.) on the upstream, downstream, and flow-through channel surfaces.

The heater is a tantalum-platinum (TaPt) high temperature compatible thin film resistive heater, fabricated into the substrate and deposited directly on the membrane.

The heater is powered with 14 volts, generating a visible glow, showing that heating is uniform over the surface of the membrane, and that there are no localized hot-spots or over-heating at the tethers.

Example 2

In this Example, an aircraft contaminant analyzer is arranged as generally shown in FIG. 4, wherein a pair of gravimetric sensors measures the desorption from a collector comprising a membrane coated with a hydrophobic zeolite coating (Z300; Zeochem LLC, Louisville, Ky.).

Figure 6:
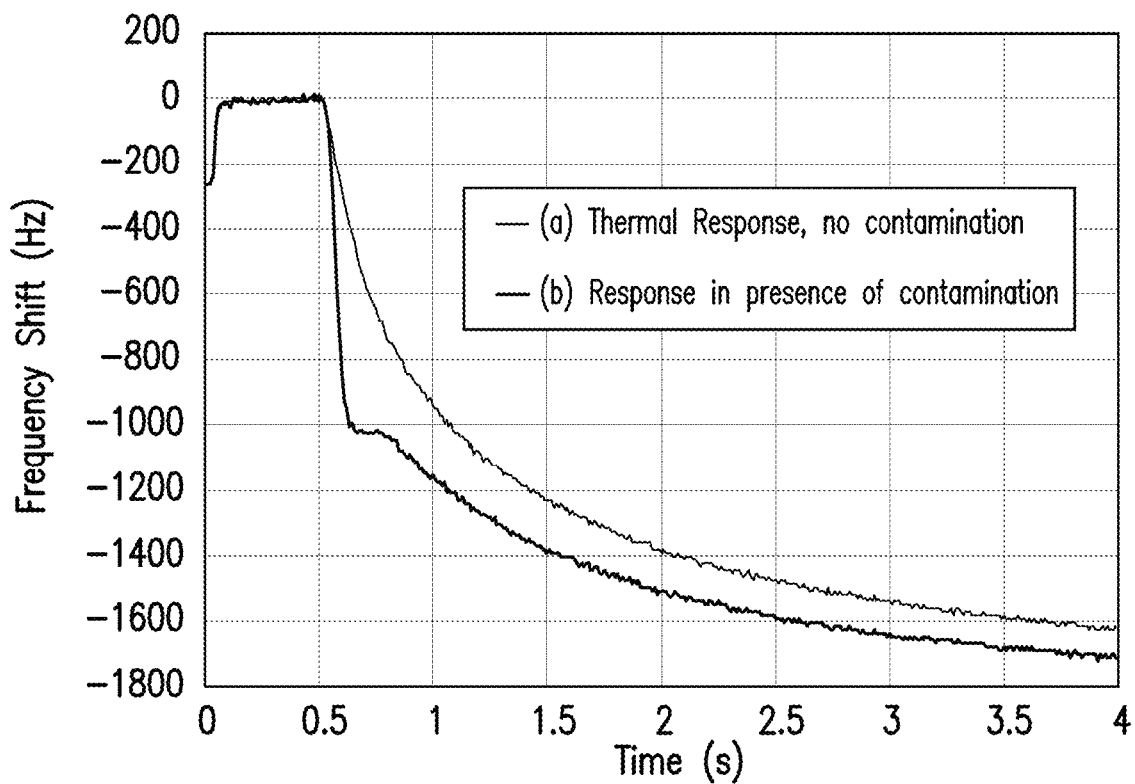
FIG. 6 shows determining the response spectra for deicing fluid, using an air craft air contaminant analyzer comprising an embodiment of the aircraft air contaminant collector device according to the invention.

The frequency shift versus time is first determined in the absence of contaminants (for example, using clean laboratory air during calibration or air passing through a sterilizing filter or without first passing air through the collector). For example, the resonance frequency is measured every 0.01 seconds for 4 seconds. Resonance frequency decreases starting at 0.5 s when heating power is applied to the collector. Heat transferred to the resonator decreases its resonant frequency. This is also called the "thermal response," and illustrates the response spectra in the absence of contaminants. The response spectra is also determined in the presence of the contaminant (deicing fluid), and both response spectra are shown in FIG. 6.

Figure 7:
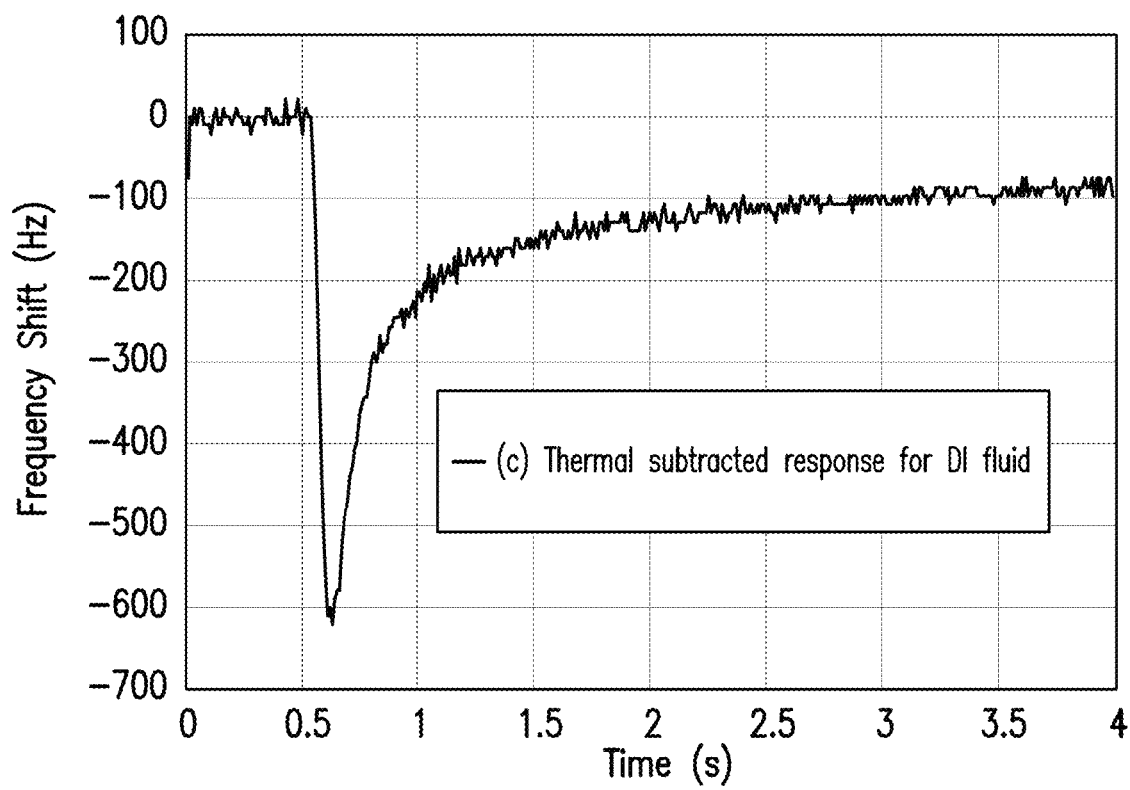
FIG. 7 shows the "thermal subtracted response" resulting from subtracting the response spectra for the absence of a contaminant (deicing fluid) from the response spectra in the presence of deicing fluid.

The first response spectra (without a contaminant) is subtracted from the second response spectra (with the contaminant), revealing the frequency shift caused by presence of the contaminant only, illustrating the "thermal subtracted response," as shown in FIG. 7.

Various features can be calculated from the "thermal subtracted responses." Four examples of such features are:

a) Maximum frequency shift (MFS): the maximum frequency shift seen during the response.

b) Sum before peak (SB): the area under the curve before the MFS.

c) Sum after peak (SA): the area under the curve after the MFS.

d) Segment #5 (S5): the average of the $37^{th}$ thru $46^{th}$ frequency measurements following the MFS.

Figure 8:
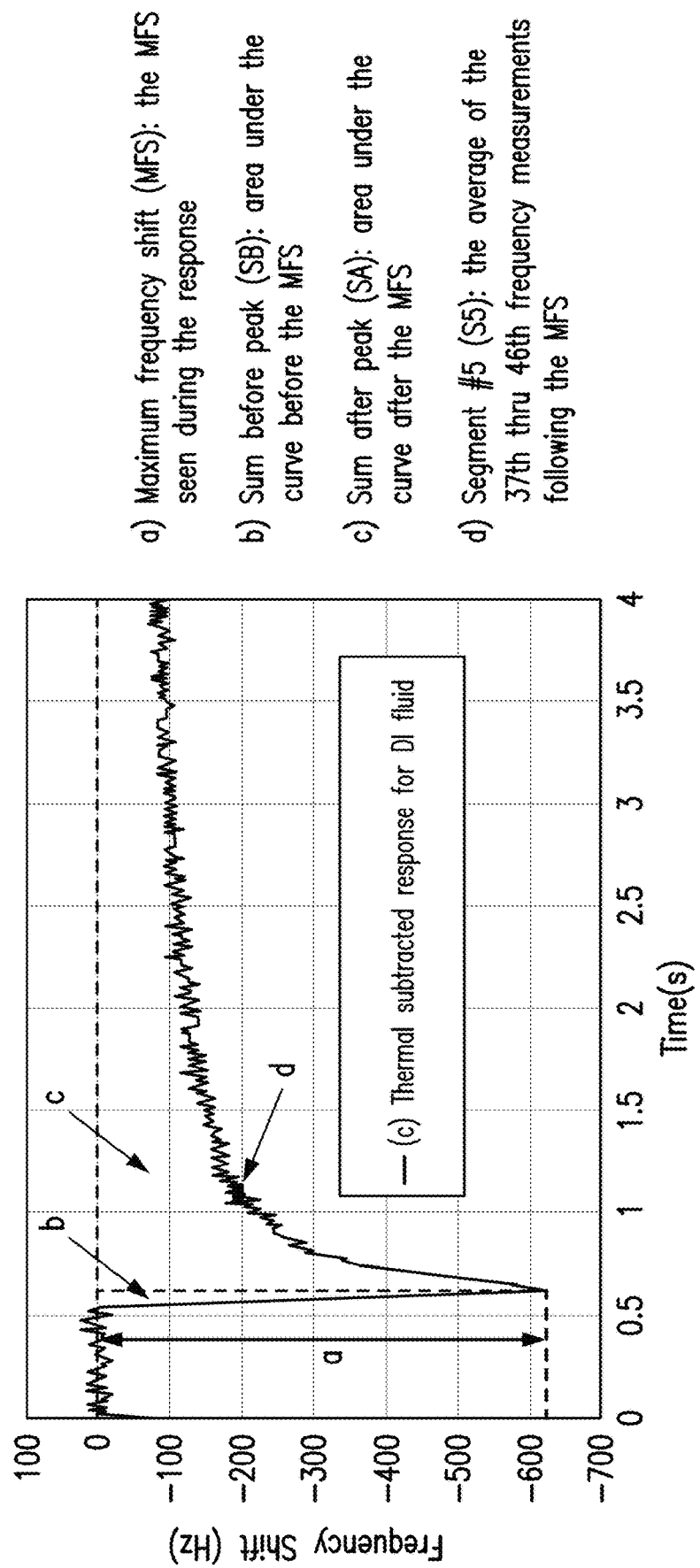
FIG. 8 shows four features that are calculated from the thermal subtracted responses: a) Maximum frequency shift (MFS); b) Sum before peak (SB); c) Sum after peak (SA); and d) Segment #5 (S5).

These four features are shown in FIG. 8.

Example 3

This example demonstrates how the feature MFS as described in Example 2 can be used by a pattern recognition algorithm to identify the contaminants.

Using an aircraft air contaminant analyzer with gravimetric sensors as described in Example 1, the frequency shift versus time is determined when the analyzer is sequentially challenged with turbine engine oil (AEROSHELL 560; Shell), hydraulic fluid (Exxon HYJET; Exxon), and deicing fluid.

Figure 9:
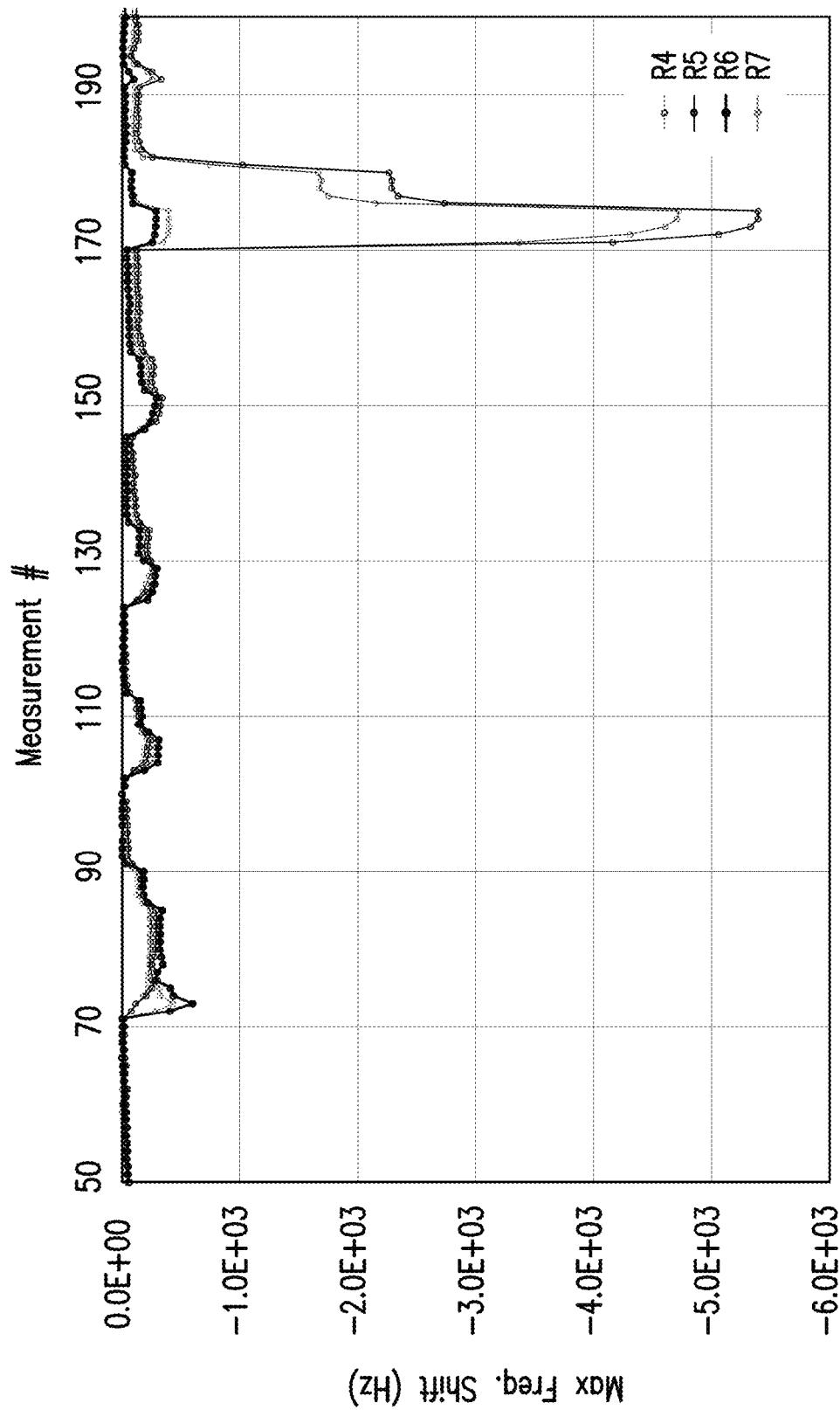
FIGS. 9 and 10 show using the feature MFS of two aircraft air contaminant collectors with different chemoselective coatings to distinguish between contaminants.

The results are shown in FIG. 9, wherein the responses (average MFSs) are similar for oil and hydraulic fluid, and different for deicing fluid.

Figure 10:
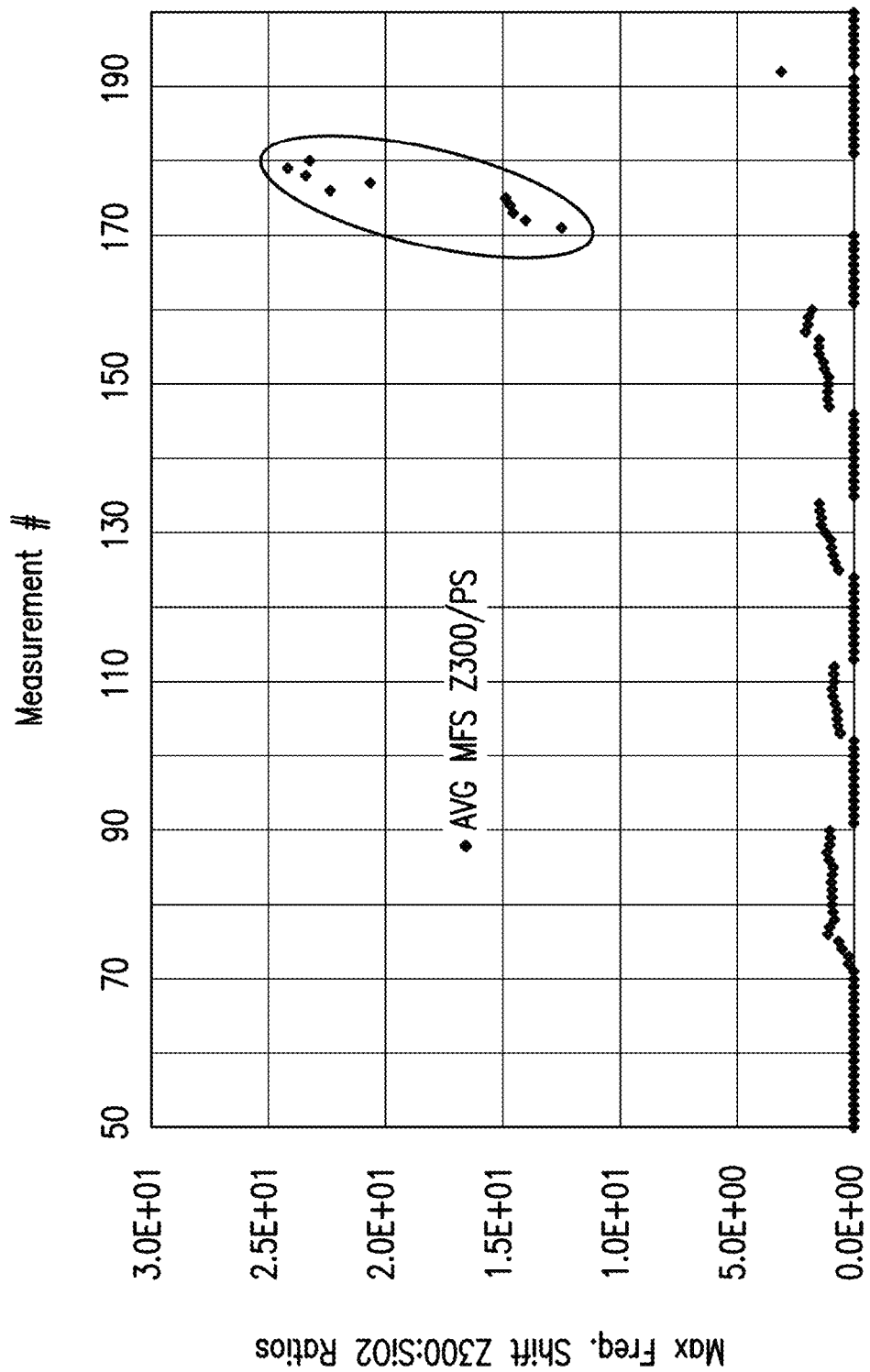

As shown in FIG. 10, the use of the feature MFS shows deicing fluid can be distinguished from hydraulic fluid and turbine engine oil: for hydraulic fluid and turbine engine oil, the ratio of the MFS feature from the gravimetric sensor next to the porous silica coated collector to the MFS feature from the gravimetric sensor next to the Z300 coated collector ranges between 0 and about 2, whereas for deicing fluid the ratio ranges between about 12 and about 23.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An air contaminant collector device for use in an aircraft air contaminant analyzer comprising:

(A) an air contaminant collector comprising:

(a) a porous member having a thickness in a range of 50 micrometers to 200 micrometers, the porous member comprising metal electrical traces and microporous flow-through channels and a chemoselective zeolite coating, the porous member having a top surface and a bottom surface, wherein the porous member desorbs captured air contaminants while being uniformly heated to at least 400° C. for a controlled time period;

(b) a thin film resistive heater, capable of heating to a temperature that vaporizes captured air contaminants, wherein the heater is covered by the chemoselective zeolite coating and the heater is in contact with the top surface of the porous member and the heater receives current through metal electrical traces on the porous member and metal electrical traces on one or more tethers; and;

(B) an air contaminant collector base comprising:
  (c) a first substrate, wherein the porous member and the thin film resistive heater are associated with the first substrate, wherein the bottom surface of the porous member contacts a top layer of the first substrate, the porous member and the heater being thermally insulated from the base, wherein the first substrate has channels providing one or more tethers connecting the porous member to the first substrate, the one or more tethers having metal electrical traces.

2. The device of claim 1, wherein the top surface of the porous member comprises an insulating layer.

3. The device of claim 1, wherein the chemoselective zeolite coating comprises a chemoselective hydrophobic zeolite coating.

4. The device of claim 1, wherein the chemoselective zeolite coating comprises a chemoselective hydrophilic zeolite coating.

5. The device of claim 1, wherein the porous member desorbs captured air contaminants while being uniformly heated to 550° C. for a controlled time period.

6. A method for capturing and desorbing captured air contaminants in aircraft air, the method comprising:
  (A) passing aircraft air through an air contaminant collector comprising:
    (a) a porous member having a thickness in a range of 50 micrometers to 200 micrometers, the porous member comprising metal electrical traces and microporous flow-through channels and a chemoselective zeolite coating, the porous member having a top surface and a bottom surface, wherein the porous member desorbs captured air contaminants while being uniformly heated to at least 400° C. for a controlled time period;
    (b) a thin film resistive heater, capable of heating to a temperature that vaporizes captured air contaminants, wherein the heater is covered by the chemoselective zeolite coating and the heater is in contact with the top surface of the porous member and the heater receives current through metal electrical traces on the porous member and metal electrical traces on one or more tethers; and;
  an air contaminant collector base comprising:
    (c) a first substrate, wherein the porous member and the thin film resistive heater are associated with the first substrate, wherein the bottom surface of the porous member contacts a top layer of the first substrate, the porous member and the heater being thermally insulated from the base, wherein the first substrate has channels providing one or more tethers connecting the porous member to the first substrate, the one or more tethers having metal electrical traces;
  (B) capturing air contaminants by the porous member; and
  (C) uniformly heating the porous member to a temperature of at least 400° C. sufficient to vaporize the captured air contaminants and desorb the captured air contaminants.

7. The method of claim 6, wherein the air contaminants comprise aerosols.

8. The method of claim 6, wherein the air contaminants comprise particulates.

9. The method of claim 6, wherein the air contaminants comprise gases.

10. The method of claim 7, wherein the air contaminants comprise particulates.

11. The method of claim 7, wherein the air contaminants comprise gases.

12. The method of claim 8, wherein the air contaminants comprise gases.

13. The method of claim 10, wherein the air contaminants comprise gases.

14. The method of claim 6, wherein passing aircraft air through the porous member comprising a chemoselective zeolite coating comprises passing aircraft air through the porous member comprising a chemoselective hydrophobic zeolite coating.

15. The method of claim 6, wherein passing aircraft air through the porous member comprising a chemoselective zeolite coating comprises passing aircraft air through the porous member comprising a chemoselective hydrophilic zeolite coating.

16. The method of claim 6, comprising uniformly heating the porous member to 550° C. to vaporize the captured air contaminants and desorb the captured air contaminants.

* * * * *